United States Patent [19]
Hoer

[11] 3,933,358
[45] Jan. 20, 1976

[54] O-RING PORT CONTOUR SHEATH AND SEAL

[75] Inventor: Kenneth Leon Hoer, Cedar Falls, Iowa

[73] Assignee: Deere & Company, Moline, Ill.

[22] Filed: Nov. 7, 1974

[21] Appl. No.: 521,621

[52] U.S. Cl. .................................. 277/170; 277/212
[51] Int. Cl.² .......................................... B16J 15/10
[58] Field of Search ............ 277/170, 178, 189, 212

[56] References Cited
UNITED STATES PATENTS

| | | | |
|---|---|---|---|
| 2,407,552 | 9/1946 | Hoesel | 277/170 |
| 3,214,181 | 10/1965 | Rood | 277/170 |
| 3,369,817 | 2/1968 | Bandy et al. | 277/170 |

*Primary Examiner*—Robert I. Smith

[57] ABSTRACT

A frusto-conical sheath of a heat resisting, non-porous, extrudable, low coefficient of friction material for sheathing the frusto-conical contour of a hydraulic port part to receive an O-ring when a mating fitting is screwed into the port part.

3 Claims, 7 Drawing Figures

O-RING PORT CONTOUR SHEATH AND SEAL

BACKGROUND OF THE INVENTION

The present invention relates generally to sealing hydraulic fittings in their mating parts and more particularly to sealing those fittings which are sealed by means of O-rings.

In the past, elastomeric O-rings used to seal fittings subjected to cyclic hydraulic pressure fluctuations often failed because of installation damage, loss of elastomer due to abrasion or high pressure extrusion nibbling, or loss of sealing force due to high temperature compression set of the elastomer.

Further, under some conditions, fretting corrosion occurred at the interface between the fitting head and its mating surface which caused loss of torque and loosening of the fitting.

SUMMARY OF THE INVENTION

It is a general object of the present invention to provide sheathing of a port contour and the area immediately adjacent thereto with a thin, compliant, low coefficient of friction material. The material's low coefficient of friction prevents installation damage to a fitting mounted O-ring as it is squeezed down into the port contour by the fitting. Further, it prevents abrasion deterioration of the O-ring due to compression sliding in the port contour and compression set due to internal temperature generation in the O-ring when the assembly is subjected to high frequency cyclic hydraulic pressure. The material's deformation characteristic prevents hydraulic extrusion nibbling loss to the O-ring as well as fitting or port area fretting corrosion.

The above and additional objects and advantages of the present invention will become apparent to those skilled in the art from a consideration of the following detailed description when taken in conjunction with the accompanying drawings.

DESCRIPTION OF THE PREFERRED EMBODIMENTS

Figure 1:
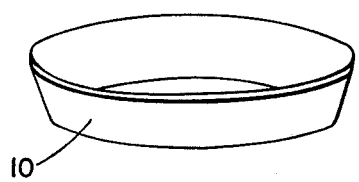
FIG. 1 is an iisometric view of the present invention.

Referring now to FIG. 1, there is shown an O-ring port contour sheath 10 having a frusto-conical configuration and made from a heat-resisting, non-porous, extrudable, low coefficient of friction material of at least 0.004 inch thickness. Such a material is TFE, a polymerized tetrafluoro-ethylene plastic. Certain other plastics in their toughest and highest melting grades may be used instead of TFE. These equivalents are polyethylene or vinyl chlorides, fluorides or mixtures of them.

Figure 2:
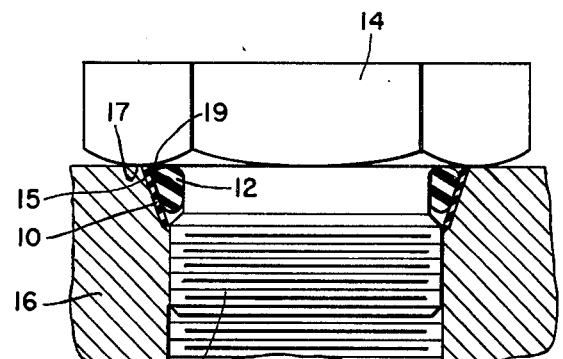
FIG. 2 is a sectional view of the present invention in its operative environment.

Shown nested in the sheath 10 in FIG. 2 is a non-porous, elastomeric toroid or O-ring 12 which may be made of nitrile or fluorocarbon rubber.

The sheath 10 is inserted in the frusto-conical port contour 15 of a hydraulic cylinder or mating part 16 (only a portion shown) and a plug or fitting 14 with the O-ring 12 mounted next to the head is inserted through sheath 10 to engage threads 18. Although of normally circular cross section, the O-ring 12 is compressed into a generally triangular cross section by the threading engagement. As the O-ring is squeezed into the port contour by the threading of the fitting, the O-ring rotates relative to the mating part 16 and slides against the interior surface of the sheath 10 and causes cold flow of the sheath 10 into any irregularities in the port contour 15. Cuts and abrasions to the O-ring which normally occur at this point due to sliding of the O-ring on the irregularities are eliminated.

As the threaded engagement tightens, the compressing of the O-ring 12 causes the sheath 10 to cold flow further to fill part of an area 19 bounded by the mating part 16, the port contour 15, and the outer surface of the O-ring 12.

Under some conditions of cyclic high pressure, a small amount of motion between the fitting 14 and the mating part 16 occurs causing a minute temporary gap 17 into which the high pressure extrudes the O-ring material. When the pressure is relaxed, the gap 17 closes and pinches or "nibbles" off a minute amount of the extruded material. In time, such cumulative material loss results in a leak. However, with the cold flow of the sheath 10 into the area 19, the O-ring material is prevented from entering the gap 17, thus eliminating the problem of hydraulic nibbling.

Under normal cyclic hydraulic pressure, the O-ring compresses away from the threads 18 under pressure so that sliding against the port contour 15 occurs and when the pressure is relaxed, the resiliency of the O-ring elastomer causes the O-ring 12 to slide back along the port contour 15 to some nominal position. Unless the port contour 15 is very smooth, this movement which is repeated with every cycle abrades a minute amount of material from the O-ring 12 at every cycle. In time, a sufficient amount of O-ring material is lost to result in a leak. However, the sheath 10 by providing a low coefficient of friction surface over the port contour 15 eliminates this abrasive loss.

Under high frequency cyclic pressure, the rapid alternate compression and relaxation of the O-ring generates heat within the elastomer from internal molecular friction, as well as friction from rubbing against the port contour. This heat build-up causes O-ring temperatures far in excess of the operating temperature of the components in which the O-ring is installed and leads to loss of elasticity and resulting compression set of the O-ring. However, the cold flow of the sheath 10 into area 19 reduces the volume available for the O-ring 12 to compress into as well as reducing the friction against the port contour 15. Thus, the heat build-up during high frequency cycling will be much less due to the sheath 10.

Figure 3:
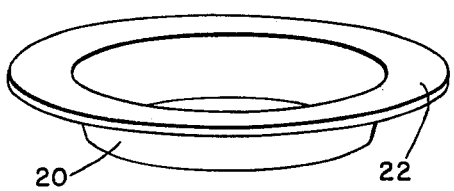
FIG. 3 is an isometric view of an alternate embodiment of the present invention.
Figure 4:
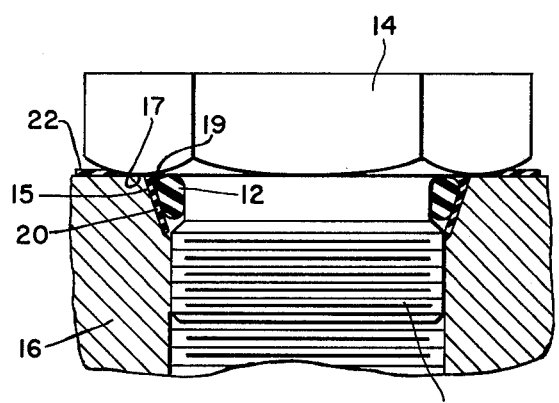
FIG. 4 is a sectional view of the alternate embodiment in its operative environment.

Referring now to FIGS. 3 and 4, there is shown an alternate embodiment in the form of a frusto-conical contour sheath 20 having an annular flange 22 about the major diameter of the frusto-conical area.

As shown in FIG. 4, the flange 22 extends over the surface area immediately adjacent to the port contour 15 and under the head of the fitting 14. The frusto-conical area of the sheath 20 acts as described aforein for the frusto-conical area of the sheath 10 of the aforementioned embodiment while the flange 22 acts as hereinafter described.

During the installation of the fitting, the flange helps to hold the sheath portion in assembly position while the fitting 14 is threaded in. As the fitting 14 is tightened, the flange 22 is trapped between the head of the fitting 14 and its mating part 16. Further torque extrudes the flange material into the irregularities and voids between the head of the fitting 14 and the mating part 16 and then pinches the flange 22 off from the sheath 20.

Under high pressure cyclic conditions minute movement at the interface between the head of the fitting 14 and its mating piece 16 causes fretting corrosion and it has been found that the material of the flange 22 helps to eliminate the fretting corrosion.

Figure 5:
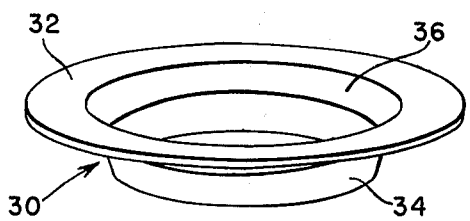
FIG. 5 is an isometric view of a further alternative embodiment of the present invention.
Figure 6:
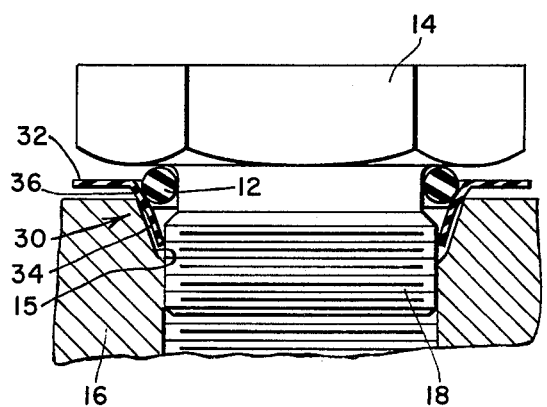
FIG. 6 is a sectional view of the further alternative embodiment being assembled.
Figure 7:
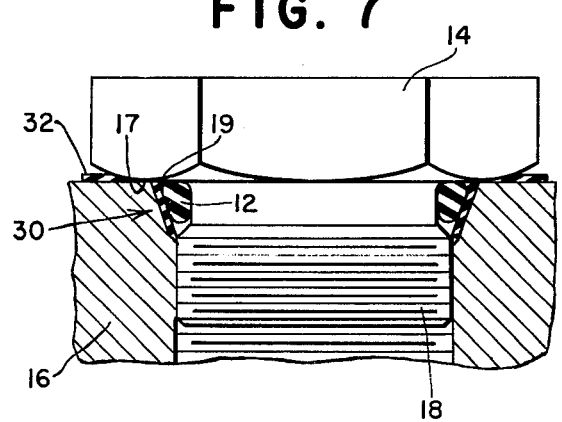
FIG. 7 is a sectional view of the further alternative embodiment in its operative environment.

Referring now to FIGS. 5, 6 and 7, there is shown a further alternate embodiment in the form of a double frusto-conical configuration sheath 30 with a flange 32. The sheath 30 has a frusto-conical configuration portion 34 to conform to the frusto-conical port contour 15 and a larger major diameter frusto-conical configuration portion 36. This double frusto-conical configuration aids assembly when the port contour angles are acute.

As shown in FIG. 6, the portion 36 rests on the edge of the port contour 15 during assembly and acts to guide the O-ring 12 into the frusto-conical portion 34. The major diameter of the portion 36 is chosen such that the first contact of the O-ring 12 with the sheath 30 during installation will occur within the major diameter rather than on the outer perimeter of the major diameter. This sizing causes the sheath 30 to remain concentric with the O-ring 12 during assembly. Thus the O-ring 12 slides smoothly and evenly into the sheath 30 which results in proper assembly.

During installation, the frusto-conical portion 36 cold flows to conform to the port contour 15, into the gap 17, and the area 19. After installation, the assembled configuration is similar to that shown in FIG. 7.

The sheath 30 and flange 22 act as described aforein for the flanged alternate embodiment shown in FIG. 3 and 4.

While the invention has been described in conjunction with specific embodiments, it is to be understood that many alternatives, modifications, and variations will be apparent to those skilled in the art in light of the aforegoing description. Accordingly, it is intended to embrace all such alternatives, modifications, and variations that fall within the spirit and scope of the appended claims.

I claim:

1. For use in combination with a frusto-conical port contour and a fitting, a seal comprising: a frusto-conical contour sheath of a heat-resisting, non-porous, extrudable, low coefficient of friction material for positioning over the frusto-conical port contour; and a non-porous, elastomeric, toroidal ring for insertion around the fitting and compressably nesting in said sheath when the fitting is positioned in the port contour.

2. The invention as claimed in claim 1 wherein the frusto-conical contour sheath has an annular flange portion in the plane of the major diameter.

3. The invention as claimed in claim 2 wherein the frusto-conical contour sheath has a plurality of frusto-conical configuration portions so as to aid the nesting of said O-ring in said sheath.

* * * * *